March 10, 1964     E. RIMAR     3,123,930

FISHING-GAFFS OR FISH-SNAGGING DEVICES

Filed March 21, 1962     2 Sheets-Sheet 1

INVENTOR
Eugene Rimar

March 10, 1964  E. RIMAR  3,123,930
FISHING-GAFFS OR FISH-SNAGGING DEVICES
Filed March 21, 1962  2 Sheets-Sheet 2

INVENTOR
Eugene Rimar

United States Patent Office 3,123,930
Patented Mar. 10, 1964

3,123,930
FISHING-GAFFS OR FISH-SNAGGING DEVICES
Eugene Rimar, 7853 1st Ave. S., Pinellas County, Fla.
Filed Mar. 21, 1962, Ser. No. 181,487
1 Claim. (Cl. 43—5)

This invention relates to a snatch-gaff or a snagging device as for gaffing or snagging hooked fish, its primary object being an aide to anglers in securely gaffing or snagging hooked fish of large size and hauling up same, when fishing from a place elevated above the surface of water, such as a bridge or a pier, where even a long handled net or a gaff is inadequate.

A further object of the invention is to provide a compact device of the character described adaptable to fishing lines, on which it can be threaded, and attached to a strong cord, lowered down towards a hooked fish, being guided towards same by the fishing line on which it is threaded for its positive positioning on said fish, for positive snagging or gaffing same.

A still further object of the invention is to provide a device of the character described with dismountable features for storage or transport.

Other objects of the invention reside in the simplicity of its construction and the combination, and arrangement of parts hereinafter fully illustrated and described.

Figure 2:
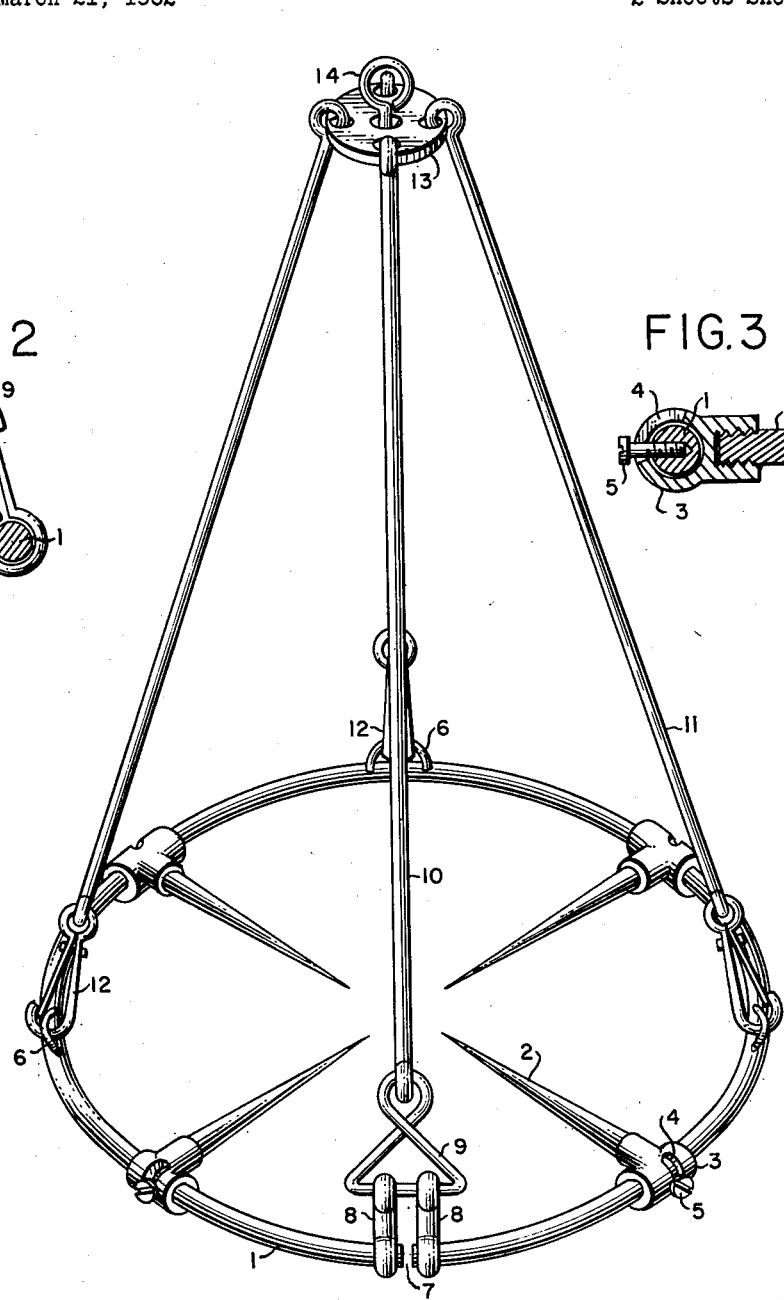
FIGURE 2 is an enlarged sectional side view of one of the two spring snap hooks mounted on the axial member forming the symmetrical, annular frame of the apparatus.
Figure 3:
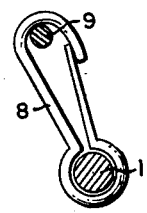
FIGURE 3 is an enlarged sectional side view of the hinge cell of the spike member mounted on the axial member forming the symmetrical annular frame.
Figure 1:
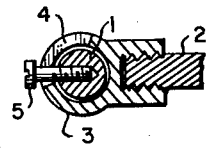
FIGURE 1 is a perspective view of the fully assembled apparatus, showing the hingably mounted spikes in a normal horizontal position.
Figure 4:
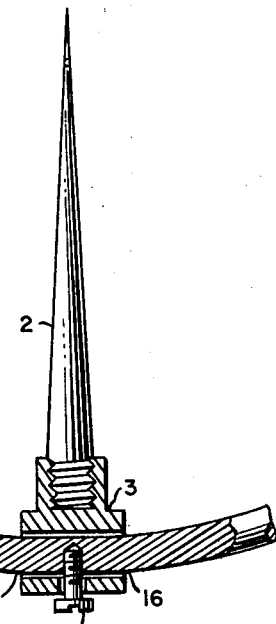
FIGURE 4 is a perspective view of the fully assembled apparatus showing the hingeably mounted spikes in a fully open position.
Figure 5:
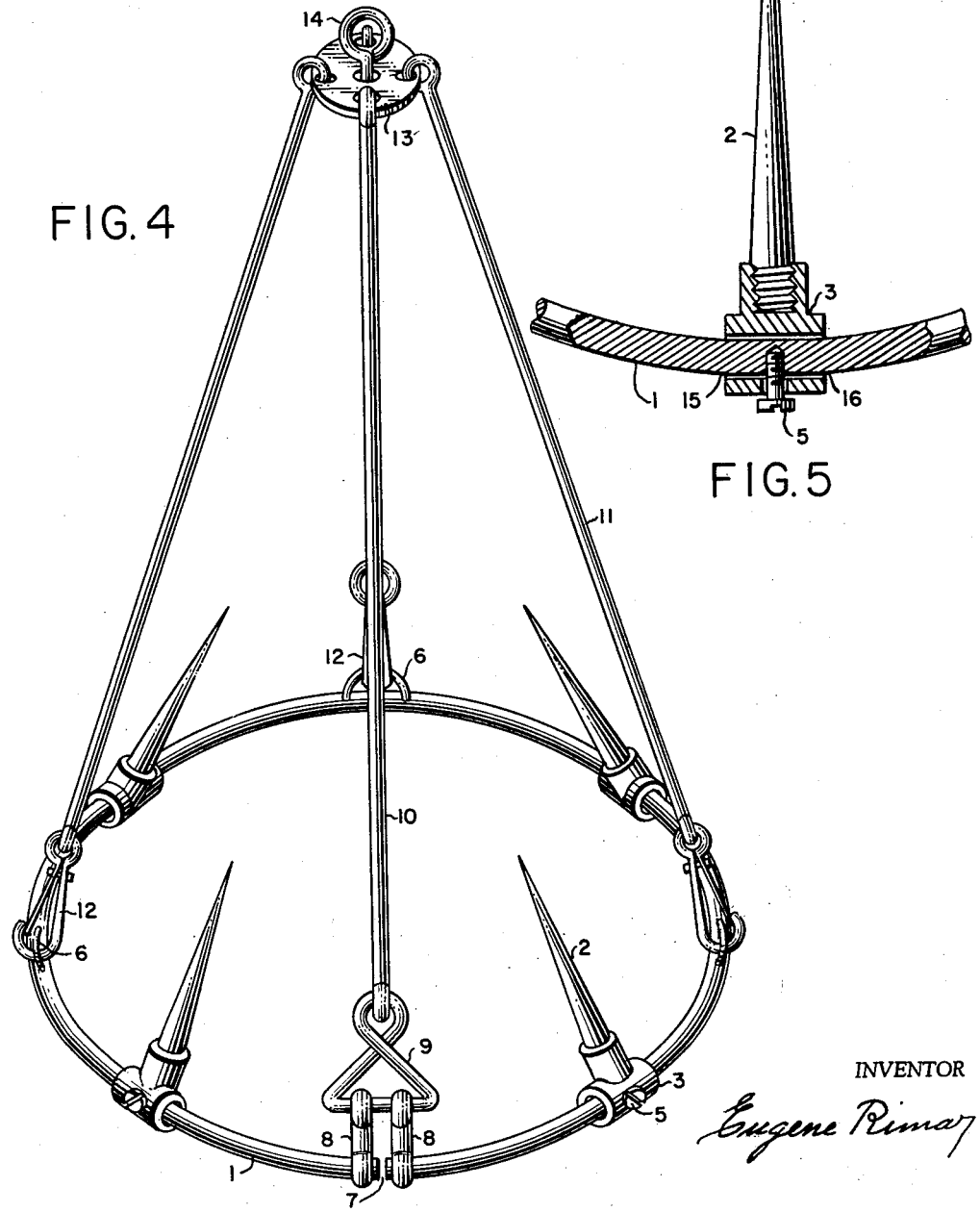
FIGURE 5 is a fragmentary top sectional view of the axial frame member showing the flattened section on which the spike member is mounted.

As shown in FIGS. 1 and 4, the apparatus comprises an arcuate frame member 1, annular in form, on which a plurality of hinge cells 3 are mounted. Each hinge cell mounts a spike element 2. Each hinge cell, as clearly seen in FIG. 3, comprises a collar like extension which is rotatably mounted on the frame 1 the collar being provided with an arcuate slot providing a guideway for screw 5 secured to the frame. The arcuate slot and screw are so oriented as to permit only a predetermined pivoted movement between the hinge cell and the frame, i.e., from a horizontal spike position (FIG. 1) to an upwardly inclined position (FIG. 4). Further movement in either direction is arrested by screw 5 abutting the ends of the guide slots 4. The frame 1 is provided with flattened portions 15, 16 in the areas of the cells and it is further interrupted to provide a through opening 7 which serves as a passageway for the fishing line and two (spring) snap hooks 8, 8 shown in detail in FIG. 2 are mounted in an upright position on the frame on each side of the said opening. The hooks serve as guide posts for the sides of the opening and further as means for detachably attaching one of the supporting means for the frame. The frame further mounts a number of upright U-shaped elements 6, disposed between the spikes, which also serve as attaching means for a support disposed thereover. The supporting member for the frame (and spikes) comprises a small disc like element 13 provided with a centrally located, upwardly directed swivel eye 14 and with peripheral apertures in which a plurality of long supporting arms 11 and a single supporting arm 10 are pivoted. The lower ends of the arms 11 are provided with spring snap hooks 12 for detachably securing said arms to the brackets 6 of the frame. The arm 10 is provided with a loop buckle 9 for detachable connection with the two snap hooks 8, 8.

The operation of the apparatus is as follows: The fully assembled apparatus is secured to a strong cord by attachment of the cord to the swivel ring 14. The loop buckle is then unhooked from snap hooks 8, 8 permitting passage of the fishing line through the opening 7. The buckle 9 is resecured onto the snap hooks 8, 8. The fishing line (with the hooked fish) is now locked within the confines of the annular frame. The apparatus is lowered by means of the cord toward the hooked fish, being guided by the contained fishing line. As the frame contacts the head of the fish, the hingeably mounted spikes are pivoted upwardly permitting the frame to descend further along the length of the fish's body with the points of the spikes leaning convergently thereagainst. When the apparatus is then drawn upwardly by means of the cord, the spikes are caused to penetrate deep into the body of the fish effecting a snag. On further upward movement, the weight of the fish occasions inward rotation of the spikes to the limit permissable as determined by the slot 4 of the cells 3. In order to remove the fish from the apparatus, the loop buckle 9 is released from the snap hooks 8, 8, the arm 10 rotated upwardly, and the fish is withdrawn from the opening formed.

While the specific details of the construction have been herein shown and described, the invention is not confined thereto as changes and or alterations may be made without departing from the spirit of the present invention.

What I claim is:

A fish-snagging device comprising a circular frame member, a plurality of T-shaped spike members each having a tubular base formed at right angles to the spike element, said spike members being threaded onto the said frame member and disposed at intervals thereon, a slot provided in the periphery of the tubular base member at right angles to the axis thereof to receive a restraining pin anchored in the circular frame member, a plurality of detachable supporting members fastened to the said circular frame member, one of said supporting members being disposed above a small gate opening in the circular frame, a loop element provided in the frame end of said supporting member, twin gate post members disposed at each side of the said gate opening to detachably receive the said loop member, and all of said supporting members extending upwardly to a junction member, for conveniently attaching a control line.

References Cited in the file of this patent

UNITED STATES PATENTS

| | | |
|---|---|---|
| 1,576,688 | Thompson | Mar. 16, 1926 |
| 1,982,132 | Boles | Nov. 27, 1934 |
| 2,575,917 | Johnson | Nov. 20, 1951 |
| 2,723,481 | Schwartz | Nov. 15, 1955 |
| 2,801,489 | Gehring | Aug. 6, 1957 |

FOREIGN PATENTS

| | | |
|---|---|---|
| 26,120 | Great Britain | Aug. 22, 1907 |